United States Patent
Schmed et al.

(10) Patent No.: US 6,240,832 B1
(45) Date of Patent: Jun. 5, 2001

(54) ASSEMBLY FOR FEEDING PREPACKAGED COFFEE PORTIONS TO A BREWING UNIT OF A COFFEE MACHINE

(75) Inventors: Arthur Schmed, Oberduernten; Heinz Züllig, Niederuzwil, both of (CH)

(73) Assignee: Fianara International B.V., Amsterdam (NL)

(*) Notice: Subject to any disclaimer, the term of this patent is extended or adjusted under 35 U.S.C. 154(b) by 0 days.

(21) Appl. No.: 09/552,367

(22) Filed: Apr. 19, 2000

(30) Foreign Application Priority Data

Apr. 23, 1999 (CH) .................................................. 0753/99
Mar. 15, 2000 (CH) .................................................. 0491/00

(51) Int. Cl.⁷ ................................................... A47J 31/34
(52) U.S. Cl. .................... 99/289 R; 99/295; 99/302 P; 99/290; 221/121; 221/150 A
(58) Field of Search ................. 99/289 P, 289 D, 99/289 R, 289 T, 295, 290, 302 P; 221/209, 277, 150 A, 87, 121

(56) References Cited

U.S. PATENT DOCUMENTS

| | | | |
|---|---|---|---|
| 2,243,895 | * 6/1941 | Brown . | |
| 3,155,212 | * 11/1964 | Hines | ........................... 99/290 X |
| 4,829,889 | * 5/1989 | Takeuchi et al. | ............... 99/289 P |
| 5,134,924 | * 8/1992 | Vicker | ............................ 99/289 R |
| 5,772,072 | * 6/1998 | Prescott et al. | .................... 221/121 |

\* cited by examiner

*Primary Examiner*—Reginald L. Alexander
(74) *Attorney, Agent, or Firm*—Tarolli, Sundheim, Covell, Tummino & Szabo L.L.P.

(57) ABSTRACT

An assembly for feeding packed portions of coffee powder to a brewing unit is provided by the present invention. That assembly has a brewing chamber and a magazine adapted to receive the coffee portion to be brewed. The magazine is rotatable and adapted to receive a plurality of cartridges, each containing a coffee portion. Further, there is provided a device for individually feeding the coffee portions into the brewing unit.

14 Claims, 6 Drawing Sheets

SECTION B-B

ASSEMBLY FOR FEEDING PREPACKAGED COFFEE PORTIONS TO A BREWING UNIT OF A COFFEE MACHINE

BACKGROUND OF THE INVENTION

The present invention refers to an assembly for feeding prepackaged coffee portions to a brewing unit of a coffee machine.

PRIOR ART

For preparing a coffee beverage, usually ground bean coffee is used. Besides of the usual filter coffee machines, also semi-automatically operating or fully automatically operating espresso machines are in wide spread use. Generally, fully automatically operating espresso coffee machines make use of an integrated grinding unit for grinding the coffee beans.

In the past years, also coffee machines have appeared in the market that make use of a coffee portion prepackaged in a capsule. The advantage of such capsules may be seen in the fact that they are of gas tight design, with the result that the coffee powder contained therein may be stored during a prolonged period of time. For brewing these capsules, coffee machines are provided that are equipped with a capsule retaining means for receiving a capsule filled with a predetermined amount of ground coffee powder. In operation, the capsule is punctured, and the coffee beverage is prepared by means of pressurized hot water flowing through the punctured capsule. It is admitted that these prepackaged coffee portions have considerable advantages; however, in such a coffee machine, the individual portions of coffee, i.e. the capsules, have to be fed manually and individually. Thus, each coffee portion has to be individually put into a capsule holder means. Thereafter, the capsule holder means is pressed into a receiving chamber means provided for that purpose, and the coffee portion is stinged and brewed with pressurized water.

Due to the fact that these coffee portions have to be fed individually, these known machines provide a low cadence and require both the presence and the manual activity of an operator.

The European Patent Publication EP 0 041 657 discloses an espresso machine that uses prepackaged portions of ground coffee for brewing a coffee beverage. The coffee portions are located on a tape member and are moved by means of transporting roller members located before and after the brewing chamber. In this way, the coffee portions are fed to the brewing chamber in which, thereafter, the coffee beverage is brewed. The fresh coffee portions, thereby, are received in a first container, provided for that purpose, and the used coffee portions are fed to a second container.

OBJECTS OF THE INVENTION

Starting from that prior art, it is an object of the present invention to provide an assembly for feeding prepackaged coffee portions to a brewing unit of a coffee machine that is suitable for receiving different coffee portions. Moreover, it is a further object of the invention to provide an assembly for feeding prepackaged coffee portions to a brewing unit of a coffee machine that is easily operable, without any manual intervention.

SUMMARY OF THE INVENTION

In order to meet these and other objects, the present invention provides an assembly for feeding packed portions of coffee powder to a brewing unit having a brewing chamber and comprising a magazine adapted to receive the coffee portion to be brewed. The magazine is rotatable and adapted to receive a plurality of cartridges, each containing coffee portions. Further, means are provided for individually feeding the coffee portions into the brewing unit.

In a preferred embodiment, it is provided that the magazine be located in such a way on a turntable member that, by rotating the turntable, as one chooses one of the cartridges can be vertically brought into position above the brewing chamber of the brewing unit, being in its rest or initial position. Thereby, the individual cartridges can be brought into their operating positions easily and quickly. If different coffee brands or sorts are received in the individual cartridges, it is just required to rotate that turntable to select the required coffee brand or sort for brewing the coffee beverage.

In a further, preferred embodiment, the assembly comprises a drawer element, located between the magazine for receiving the coffee portions to be prepared and the brewing unit. By means of the provision of such a drawer element, an individually selectable coffee portion can be used for brewing a coffee beverage, independent of the coffee portions received in the cartridges.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
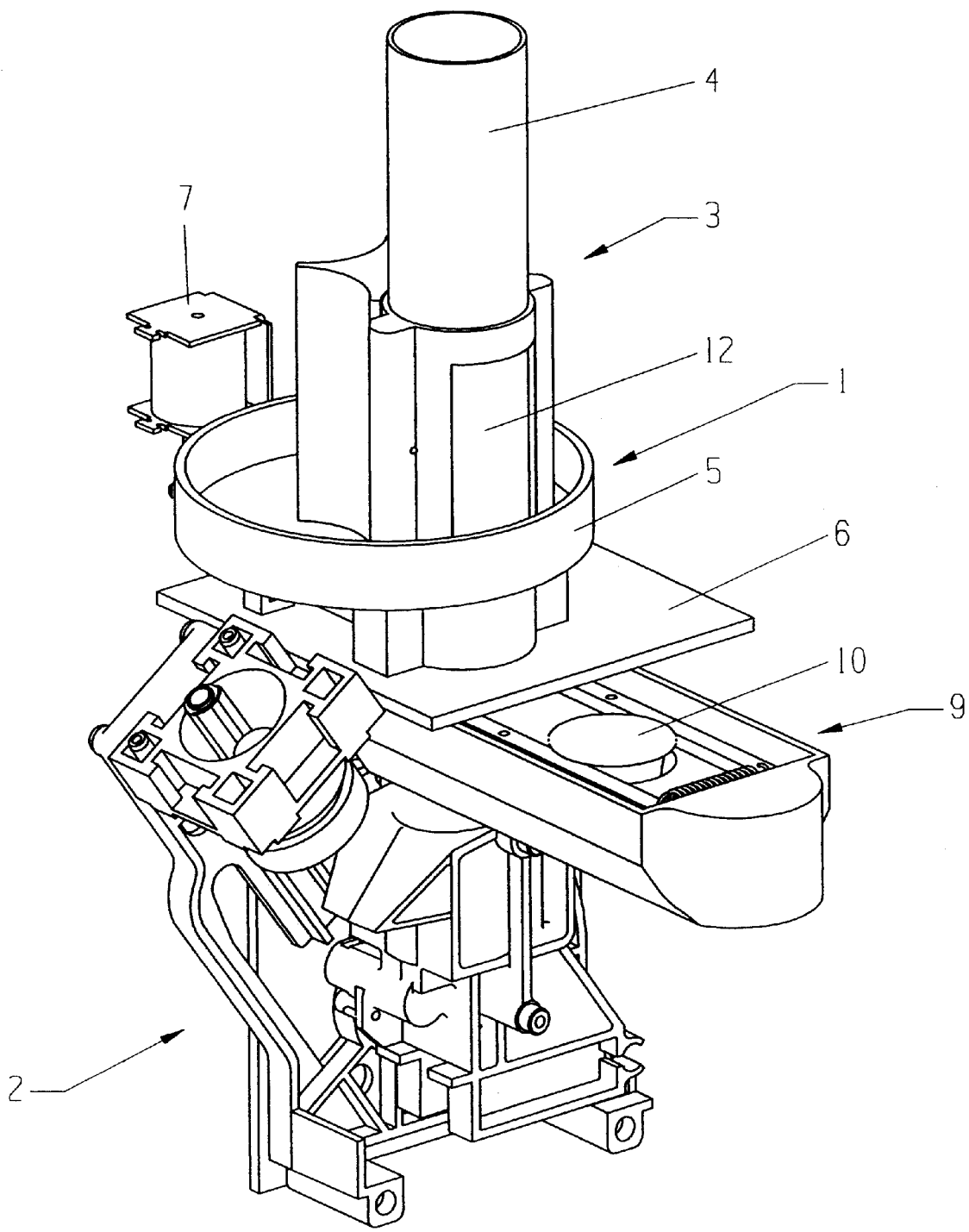
FIG. 1 shows a perspective view of the assembly according to the invention.

FIG. 1 shows a perspective view of a feeding assembly 1 for feeding pre-packaged coffee portions to a brewing unit 2. The feeding assembly 1 comprises a magazine 3 located on a turntable 5 and adapted to receive four cartridges. However, in the present example, only one cartridge 4 is shown in FIG. 1. Each cartridge 4 is adapted to receive a plurality of coffee portions. The provision of a magazine 3 adapted to receive a plurality of cartridges has the advantage that, if appropriate, the cartridges can be filled with coffee portions of differing content, for example with different coffee brands for preparing espresso, ristretto, cappuccino, normal coffee and the like. Thus, by providing four cartridges, four different coffee brands can be received in the feeding assembly 1. Thereby, it is understood that two or more of the cartridges can be filled with the same coffee portions.

Each of the cartridges is provided with latch members that are adapted to retain the coffee portions and to release the same individually by a controlled operation. These latch members will be further described hereinafter with the help of the FIGS. 2 and 4. The turntable 5 is located on a plate member 6, whereby catch members (not shown) are provided for locking and positioning the turntable 5. These catch members 5 snap into position as soon as a cartridge is positioned directly above the brewing chamber of the brewing unit 2. In the example shown in FIG. 1, the cartridge 4 is in its operational position, in which the coffee portions can be fed into the brewing chamber of the brewing unit 2. Since such catch members are well known in the art, they are not further shown nor explained here in detail.

Moreover, the plate member 6 serves for supporting a lever mechanism that is operable by means of an electromagnet 7. Below the plate member 6, there is provided a drawer member 9 that is adapted to receive individual coffee portions 10.

Preferably, each of the cartridges is provided with a window or sight-glass member 12. Thus, the user of the coffee machine is in a position to recognize which coffee brand is received in which cartridge. Moreover, thereby it may be recognized which coffee brand is positioned over the brewing unit 2 and will be used, in a next step, to brew the coffee beverage. In order to facilitate to recognition of the coffee brand, the coffee portions can differ, for example, as far as their color is concerned. However, it is also possible to provide the individual coffee portions with a code that can be recognized with a corresponding code reader means. In this way, the coffee portions and, particularly, their content can be electronically recognized. Such recognition can be used, for example, to show on a display which brand of coffee will be used when the coffee machine is started to prepare the next coffee beverage. Another possibility could be seen in the fact that the user of the coffee machine determines, via an input device, which coffee brand he wishes to be prepared next, and that the rotation of the turntable 5 is electronically controlled such that the appropriate coffee brand contained in one of the cartridges is in the appropriate operating position above the brewing unit 2. However, the means therefore are not shown in the drawings.

Figure 2:
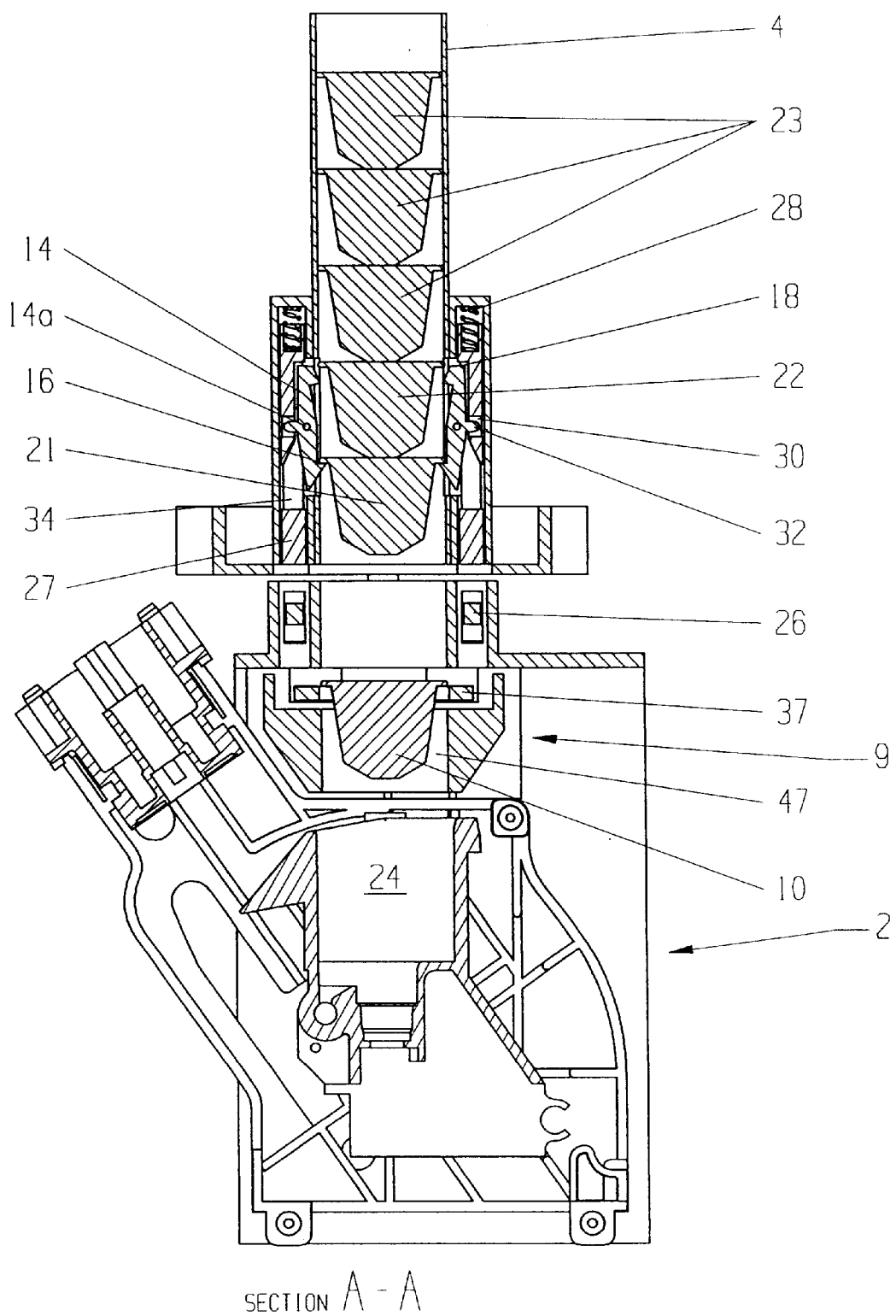
FIG. 2 shows a longitudinal sectional view of the assembly of FIG. 1.

FIG. 2 shows a longitudinal sectional view of the feeding assembly 1, including the brewing unit 2. For the sake of simplicity, in the case if same elements are present twice, only one is provided with a reference numeral.

In this view, latch members 14 are shown that constitute a portion of the means for individually dispense the coffee portions. The latch members 14, rotatable around a central axis 14a, have a double function: At their lower side, they have a first support surface for catching the coffee portions 21 ready to be dispensed, and at their upper side, they have a second support surface for supporting the succeeding coffee portion 22. In the position shown in this illustration, the latch members 14 hold the lowermost coffee portion 21 at its upper edge by means of their lower support surfaces 16. Thereby, that particular coffee portion is positioned exactly vertically above the brewing chamber 24 of the brewing unit 2, such that, once released, it falls into the brewing chamber 24 under the influence of the gravity.

Moreover, in this illustration, a rocking lever member 26 can be recognized; that rocking lever member is operationally connected to the electromagnet 7. In order to enable the latch members bers 14 to be pivoted, vertically running actuating rod members 27 are provided that are actuated by the rocking lever member 26. The latch members 14 are provided with cams 32 engaging slots 30 provided in the actuating rod member 27, such that the latch members 14 are rotated around their pivoting axis 14a as soon as the actuating rod members 27 are moved. Moreover, the actuating rod members 27 are provided with recesses 34 adapted to receive the lower portion of the latch members 14; thus, the latch members 14 can be rotated to such an extent that the lower supporting surface 16 releases the coffee portion 21 to be dispensed, while simultaneously the subsequent coffee portion 22 comes to a rest on the upper support surface 18.

By means of the rocking lever member 26, actuated by the electromagnet 7 (FIG. 1) the actuating rod members 27 can be driven in upwards direction, opposite to the force of a spring member, with the result that the right side latch member is rotated in clockwise direction, while the left side latch member is rotated in counterclockwise direction. By rotating the latch members 14, as has been explained herein above, the lowermost coffee portion 21 is released and falls, under the influence of gravity, downwards into the brewing unit. Thus, by actuating the electromagnet, the lowermost coffee portion 21, located above the brewing unit, is released to be brewed and the subsequent coffee portion 22 is fixed in a ready position. The entire design is such that the rocking lever member acts only on that cartridge that is aligned with the brewing chamber. Thereby, it is ensured that the lowermost coffee portion is released only and can be released only, respectively, if it is positioned exactly above the brewing chamber.

Figure 3:
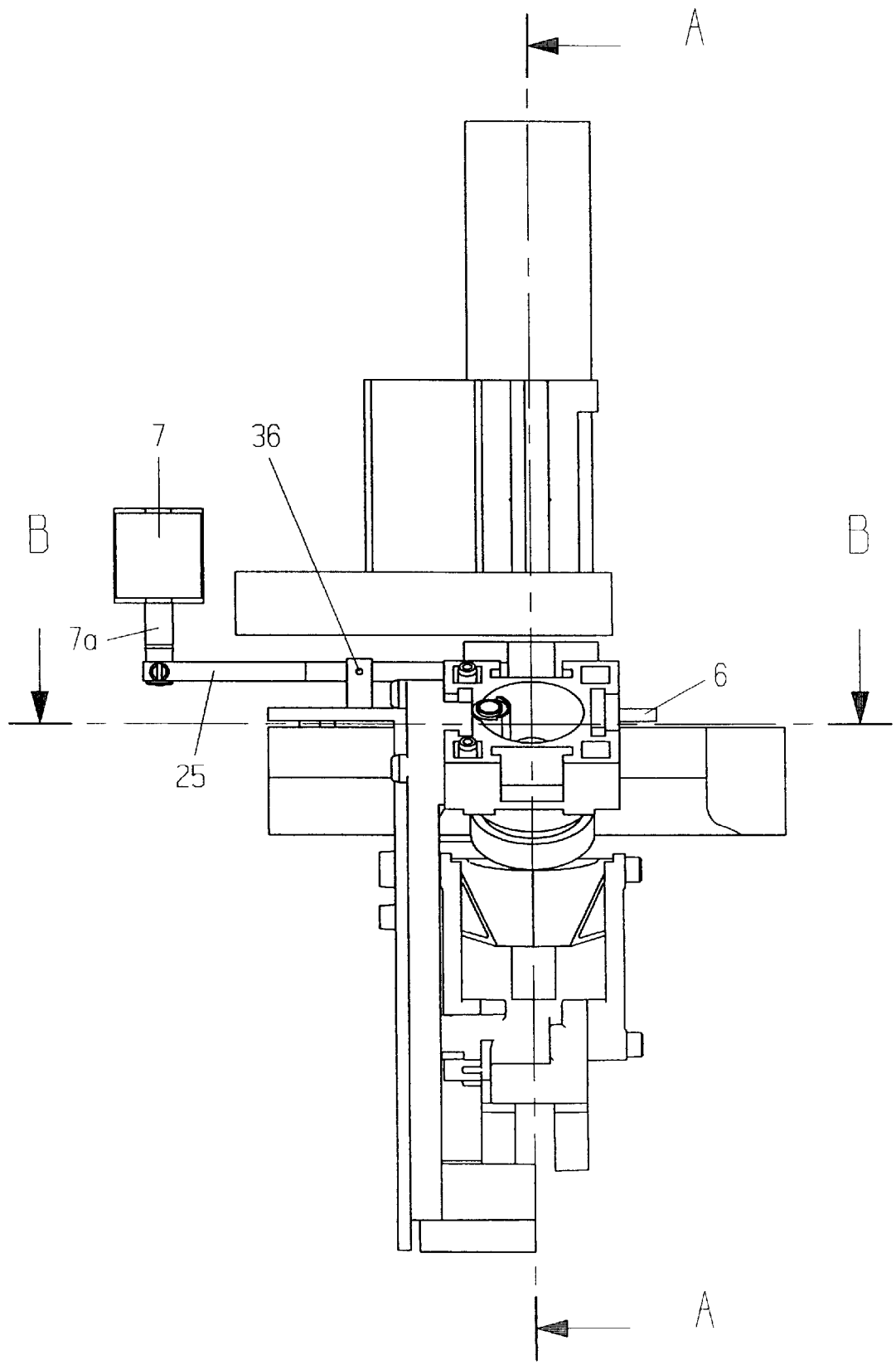
FIG. 3 shows a lateral view of the assembly of FIG. 1.

FIG. 3 shows the feeding assembly 1 in a side view. From this illustration, the electromagnet 7 as well as the rocking lever member 25 are visible. The rocking lever member is rotatably supported in a bearing member 36 and forms a portion of a lever mechanism for the actuation of the latch members. The electromagnet 7 itself is fixed to elements not further shown in the drawing. An actuation of the electromagnet 7 has the effect that its armature 7a moves downwards. The result is that the rocking lever member 26 is rotated around its pivot, thereby tilting with its left side downwards and with its right side upwards.

Figure 4:
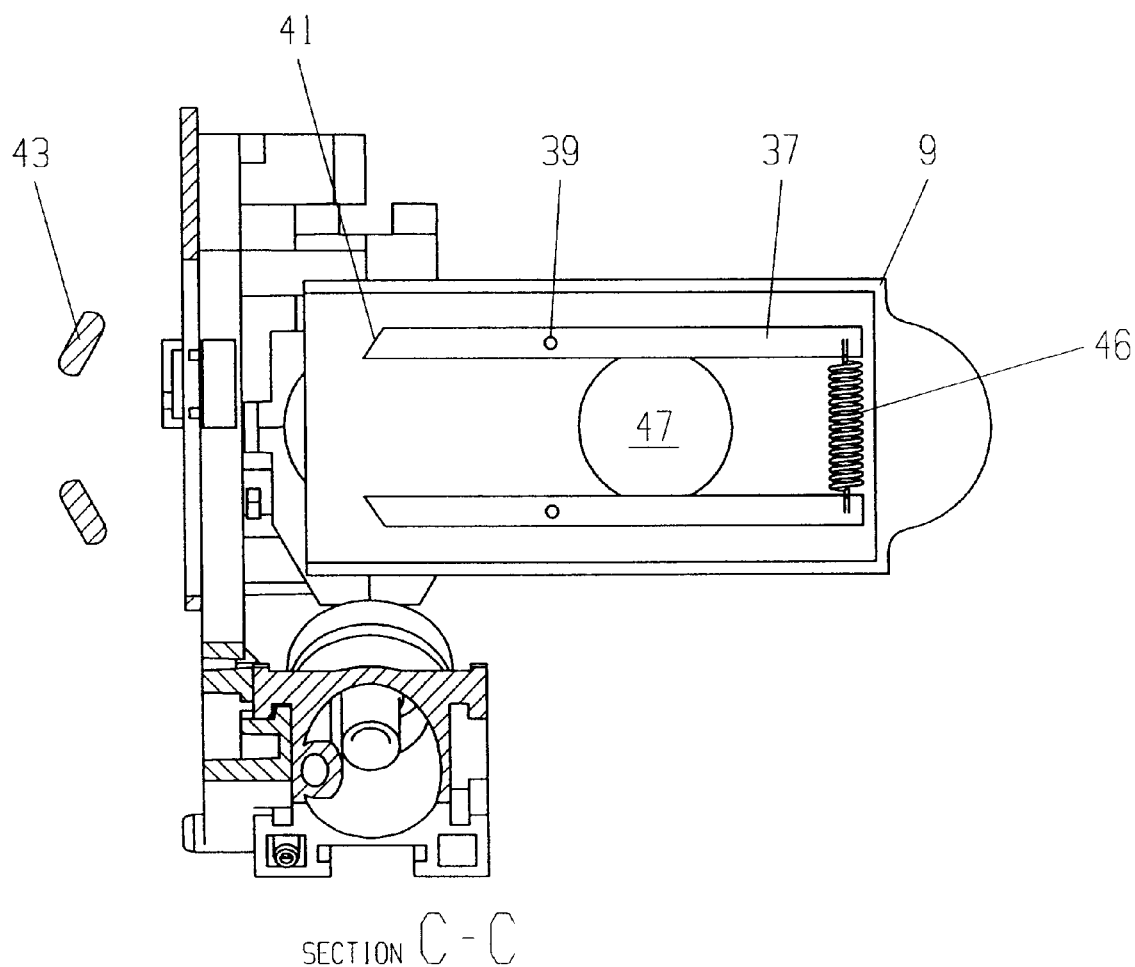
FIG. 4 shows a top view of a drawer member adapted to feed a single coffee portion, the drawer member being in its pulled-out position.
Figure 5:
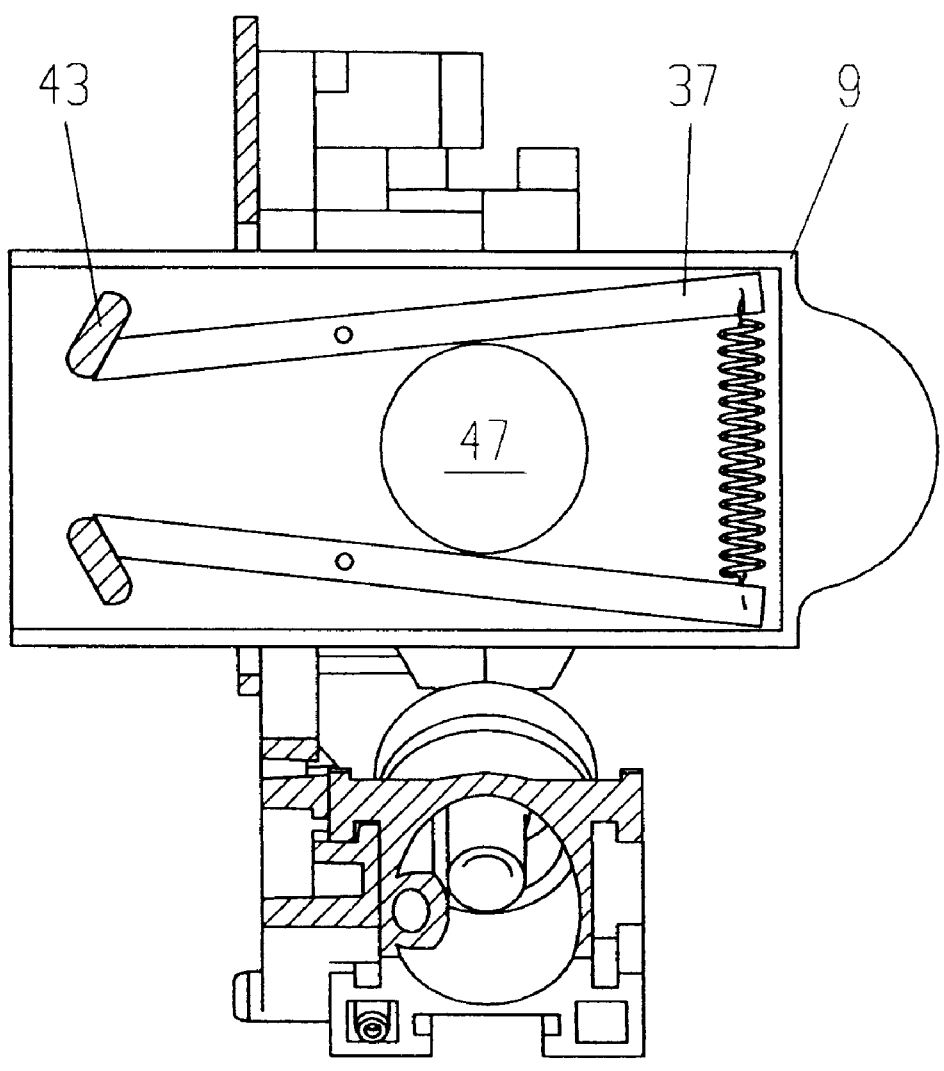
FIG. 5 shows a top view of the drawer member adapted to feed a single coffee portion, the drawer member being in its pushed-in position.

FIG. 4 shows a top view of the drawer member 9 adapted to feed a single coffee portion, the drawer member being in its pulled-out position, and FIG. 5 shows a top view of the drawer member 9 in its pushed-in position. The manually movable drawer member 9 comprises two fork members 37 pivotally supported at a bearing 39. The fork members are biased by means of a pulling spring member 46, running parallel to each other in the rest position or situation shown in the drawing. In that rest position, the fork members 37 slightly cover an opening 47 provided in the drawer member 9. The front sides of that fork members 37 that are opposite from the a pulling spring member 46 are obliquely designed. The opening 47 simultaneously serves as a positioning help point when a coffee portion is inserted. Thus, it is ensured that a coffee portion is received in the drawer element 9 in a predetermined position. Thereby, the diameter of this opening is slightly larger than the greatest outer diameter of the coffee portion.

The drawer member 9 being in its pushed-in condition, the opening 47 is flush with the brewing chamber 24 and with the cartridge 4 that is in its operating position (cf. FIG. 2). At the back side of the feeding assembly 1, two coulisse elements 43 are provided. The fork members 37 engage these coulisse elements 43 with their oblique front face 41 once the drawer element 9 is in its pushed-in position. Thereby, these coulisse elements 43 are forced to a pivoting motion opposite to the force of the spring member 46. As can be seen in FIG. 5, showing the drawing member 9 in its pushed-in position, the fork members 37 are rotated, opposite the force of the spring member 46, by these coulisse elements 43 to such an extent that the release a coffee portion 10 (FIG. 2) resting on the fork members 37 is initiated. In this position, the fork members 37 don't interleave the opening 47 anymore.

Figure 6:
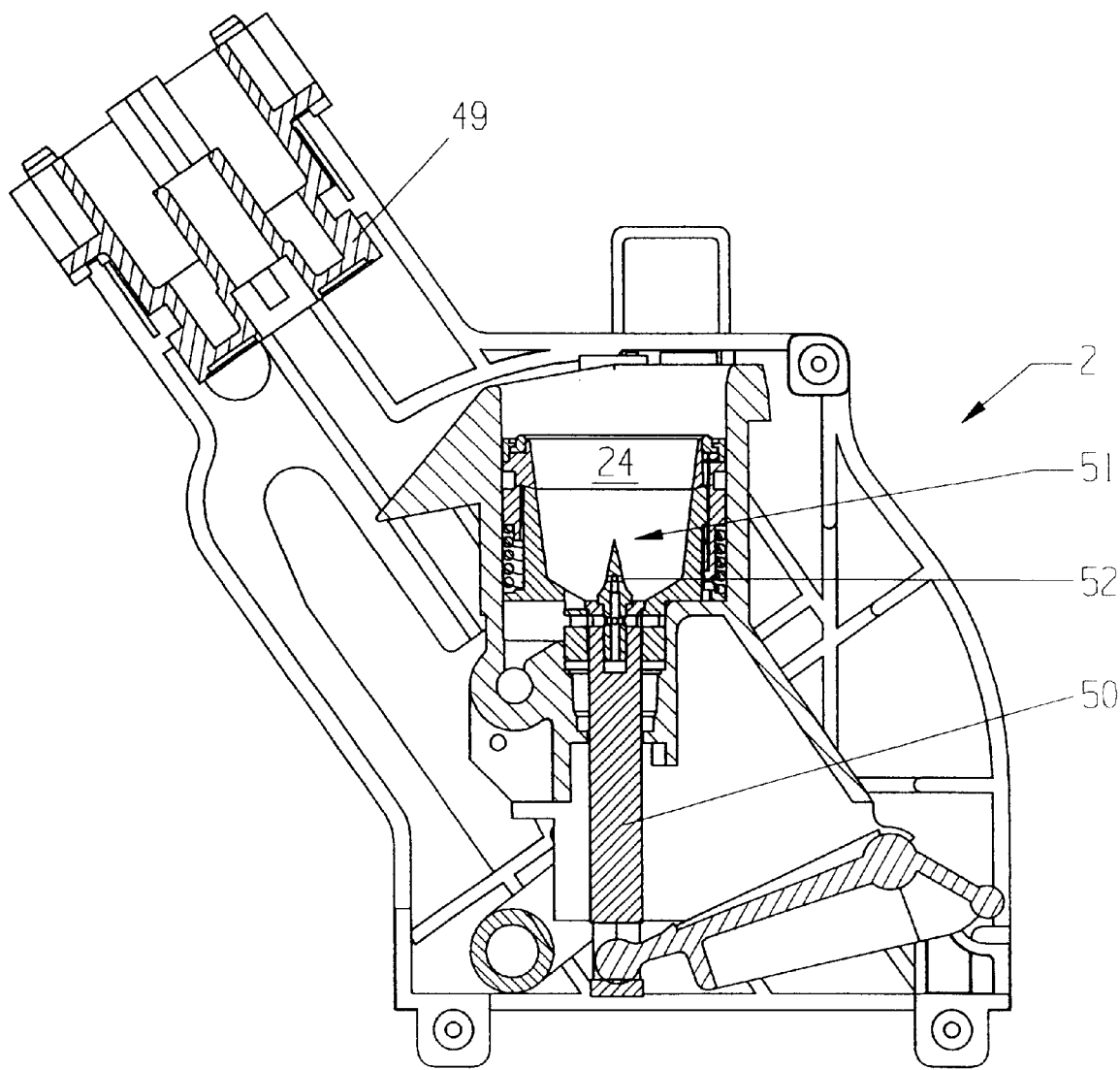
FIG. 6 shows a longitudinal sectional view of the brewing unit.

FIG. 6 shows a longitudinal sectional view of the brewing unit 2. That brewing unit 2 comprises a pivoting brewing chamber 24 and a stationary closure piston member 49. The closure piston member 49 is provided with a plurality of prismatic protrusions (not shown in the drawings). Between those prismatic protrusions, a plurality of apertures (not shown) are located, through which the brewed coffee beverage escapes from the brewing chamber 24, whereby the brewed coffee beverage flows through not further shown conduits to the real coffee beverage outlet. A push rod member 50 movable with regard to the brewing chamber 24 runs through the bottom of the brewing chamber 24. The front portion of this push rod member 50 is provided with a hollow sting element 51 provided with radially extending bores.

The feeding of a coffee portion provided for brewing a coffee beverage, with the help of the assembly shown in the drawings, takes place as follows, whereby it is understood that only those parts and elements that are essential in connection with the present invention are further discussed and whereby the coffee machine itself is not shown.

First, that cartridge 4 that contains the desired coffee brand is brought into position by manually rotating the turntable 5. In the sight glass member 12, the operator can check what coffee brand is contained in the cartridge 4 that is right now in its operating position and what cartridge 4 will be fed to the brewing chamber 24 subsequently. Thereafter, as is well known to any person skilled in the art, the brewing operation is starting by pressing the appropriate start button. Thereby, the electromagnet 7 is activated, which rotates the latch members 14 by means of the lever mechanism 7, 26, 27. Thus, the lowermost coffee portion 21 is released and falls, under the influence of gravity, into the brewing chamber 24. As soon as the coffee portion 21 has been released, the electromagnet 7 is deactivated, such that the latch members 14 rotate back in their initial position under the influence of their spring biased actuating rod members 27. Upon that back rotation of the latch members 14, the coffee portions move up, due to the fact that the upper support surface 18 now has released the lowermost coffee portion, with the result, that that lowermost coffee portion now rests against the lower support face 16, Thereafter, the brewing chamber 24 is rotated to the left side, be means of a mechanism not further shown in the drawings, and moved upwards against the closure piston member 49 and, finally, closed by the latter one on its upper side. Thereafter, the push rod member is retracted such that its tip 51 penetrates the bottom of the coffee portion. Now, by means of that tip 51, brewing water is fed that escapes via the radial bores 52 from the tip 51. Under the influence of the hydraulic brewing pressure, the coffee portion is pushed upwards such that the prism shaped protrusions penetrate the cover of the coffee portion. Now, the brewing water can flow through the coffee portion and the coffee powder contained therein, respectively, and can further flow through the afore mentioned bores located between the prismatic protrusions through the closure piston member 49 to the beverage outlet. Thereafter, the brewing chamber 24 is moved back in its initial position, and the used coffee portion is removed from the brewing chamber 24 by means of the upwardly moving sting member 50.

The hydraulic admission of the coffee portion located in the brewing chamber simultaneously is used for sealing the coffee portion with regard to the brewing chamber. Thereby, the forces built up in this way press the coffee portion against sealing means that are not further shown in the drawing.

Instead of feeding coffee portions from the cartridges, individual coffee portions can be fed also by means of the drawer member 9. For this purpose, the drawer 9 is pulled out and a coffee portion is put therein in such a way that its lower portion is received in the opening 47. As soon as the drawer member 9 is fully pushed in, the fork members 37 release the coffee portion. Then, the coffee portion falls into the brewing chamber 24 under the influence of gravity. Finally, the brewing of the coffee beverage takes place as herein before described.

The feeding assembly of the invention and as described as an embodiment herein before has the advantage that the coffee portions can be fed to the brewing unit simply, quickly and properly. By the provision of several cartridges, the individual cartridges can receive different coffee brands, such that a user can chose, if appropriate, what coffee brand is preferred for the preparation of the coffee beverage. By the provision of the drawer element 9, moreover, a further coffee brand, not received in the cartridges, can be used for brewing the coffee beverage.

As an alternative to the cartridges herein before described, being a portion of the feeding assembly 1 and having to be manually refilled with coffee portions, it would be possible to provide a packaging for the coffee portions in the form of such a cartridge. In this case, it is understood that the cartridges not more had to be filled with coffee portions, but such a package could be directly inserted into the assembly 1.

What is claimed is:

1. An assembly for feeding packed portions of coffee powder to a brewing unit means having a brewing chamber means, comprising a magazine means adapted to receive the coffee portion means to be brewed, said magazine means being rotatable and adapted to receive a plurality of cartridge means each containing coffee portion means; and means for individually feeding said coffee portion means into said brewing unit means.

2. An assembly according to claim 1 in which said magazine means is located on a turntable means, said turntable means being rotatable in such a way that selectively one of said cartridge means can be positioned vertically above said brewing chamber means when said brewing chamber means of said brewing unit is in its initial or rest position.

3. An assembly according to claim 1 in which said means for individually feeding said coffee portion means into said brewing unit means comprises latch means adapted to hold the coffee portion to be subsequently released and further adapted to release said coffee portion upon a controlled operation.

4. An assembly according to claim 3 in which said latch means are rotatable and have to end means comprising a rest surface means adapted to hold and support, respectively, a coffee portion, such that, by rotating said latch means, the supported lowermost coffee portion is released and the subsequent coffee portion is supported.

5. An assembly according to claim 1 in which a drawer unit means is provided between said magazine means adapted to receive the coffee portion means to be brewed and said brewing unit means that is adapted to receive an individual coffee portion.

6. An assembly according to claim 5 in which said drawer unit means is provided with holding means for vertically supporting said coffee portions, whereby said holding means release the coffee portion once said drawer means is fully pushed in, such that this coffee portion falls into said brewing chamber means of said brewing unit means.

7. An assembly according to claims 1 in which there is provided an electromagnet means that is operatively coupled to said latch means by a lever mechanism means to actuate said latch means.

8. An assembly according to claim 7 in which said lever mechanism means comprises a rotatably arranged rocking lever means that is connected, on the one side, with said electromagnet means and on the other side with vertically extending actuating rod means, whereby said actuating rod means are operationally coupled to said latch means such that the latter ones pivot around a pivot point when said electromagnet means is actuated and, thereby, release the lowermost coffee portion and simultaneously support the subsequent coffee portion.

9. An assembly according to claim 1 in which at least one sensor means is provided for electronically recognizing the brand of the coffee portion received in said cartridge means.

10. An assembly according to claim 1 in which said brewing unit means comprises a brewing chamber means pivotable between a rest position and an operating position as well as stationary closure piston means.

11. An assembly according to claim 1 in which said closure piston means is provided with a plurality of protrusion means adapted to perforate coffee portions received in said brewing chamber means as well as with a plurality of bores for passing the brewed coffee beverage.

12. An assembly according to claim 10 in which there is provided a push rod means towering above the bottom of said brewing chamber means, said push rod means being movable with regard to said brewing chamber means and having a hollow sting means located at its front, said sting means provided with radially extending bores for leading hot brewing water into the coffee portion.

13. An assembly according to claim 12 in which said push rod means is adapted to push out the used coffee portions.

14. An assembly according to claim 1 in which individual coffee portions are received in a packaging serving as said cartridge member.

\* \* \* \* \*